United States Patent [19]

Shenoha

[11] Patent Number: 5,105,550
[45] Date of Patent: Apr. 21, 1992

[54] APPARATUS FOR MEASURING GOLF CLUBS

[75] Inventor: James L. Shenoha, Lockport, Ill.

[73] Assignee: Wilson Sporting Goods Co., River Grove, Ill.

[21] Appl. No.: 674,609

[22] Filed: Mar. 25, 1991

[51] Int. Cl.⁵ .............................................. G01B 3/00
[52] U.S. Cl. ...................................... 33/508; 33/1 N; 33/549; 273/77 R
[58] Field of Search .............. 33/528, 1 N, 549, 567.1, 33/573, 568; 273/77 R

[56] References Cited

U.S. PATENT DOCUMENTS

| | | |
|---|---|---|
| 2,607,124 | 8/1952 | Dery ................................ 33/567.1 |
| 3,208,150 | 9/1965 | Rhodehamel . |
| 3,429,576 | 2/1969 | Ikeda . |
| 3,909,004 | 9/1975 | Vella . |
| 3,979,125 | 9/1976 | Lancellotti . |
| 4,079,520 | 3/1978 | Davis . |
| 4,104,802 | 8/1978 | Johnston .............................. 33/508 |
| 4,179,125 | 12/1979 | Cone . |
| 4,204,332 | 5/1980 | Gray . |
| 4,211,415 | 7/1980 | Lindo . |
| 4,245,392 | 1/1981 | Heller .................................... 33/508 |
| 4,482,155 | 11/1984 | Higley . |
| 4,575,090 | 3/1986 | Heseltine . |
| 4,580,350 | 4/1986 | Fincher . |
| 4,655,457 | 4/1987 | Thompson . |
| 4,817,294 | 4/1989 | Lai ........................................ 33/508 |
| 4,824,114 | 4/1989 | Catalano . |
| 4,858,332 | 8/1989 | Thomas ................................ 33/508 |
| 4,885,847 | 12/1989 | Korfanta .............................. 33/508 |
| 4,928,397 | 5/1990 | Wang .................................... 33/508 |

FOREIGN PATENT DOCUMENTS 2448124 10/1980 France ................................. 33/1 N

OTHER PUBLICATIONS

The Complete Golf Club Fitting Plan, Fitting Variable #4 Club Length, by Ralph Multby, 1986, pp. 8 and 9.
Photographs of prior art devices (3) (no date).

*Primary Examiner*—William A. Cuchlinski, Jr.
*Assistant Examiner*—Alvin Wirthlin

[57] ABSTRACT

An apparatus for measuring the length, lie and loft of a golf club includes a base having a flat top surface and a pivot plate which is pivotally mounted relative to the base for pivoting movement about a pivot axis which lies in the plane of the flat top surface of the base. The shaft of the club is held by the pivot plate so that the centerline of the shaft is perpendicular to the pivot axis and passes through the pivot axis.

19 Claims, 7 Drawing Sheets

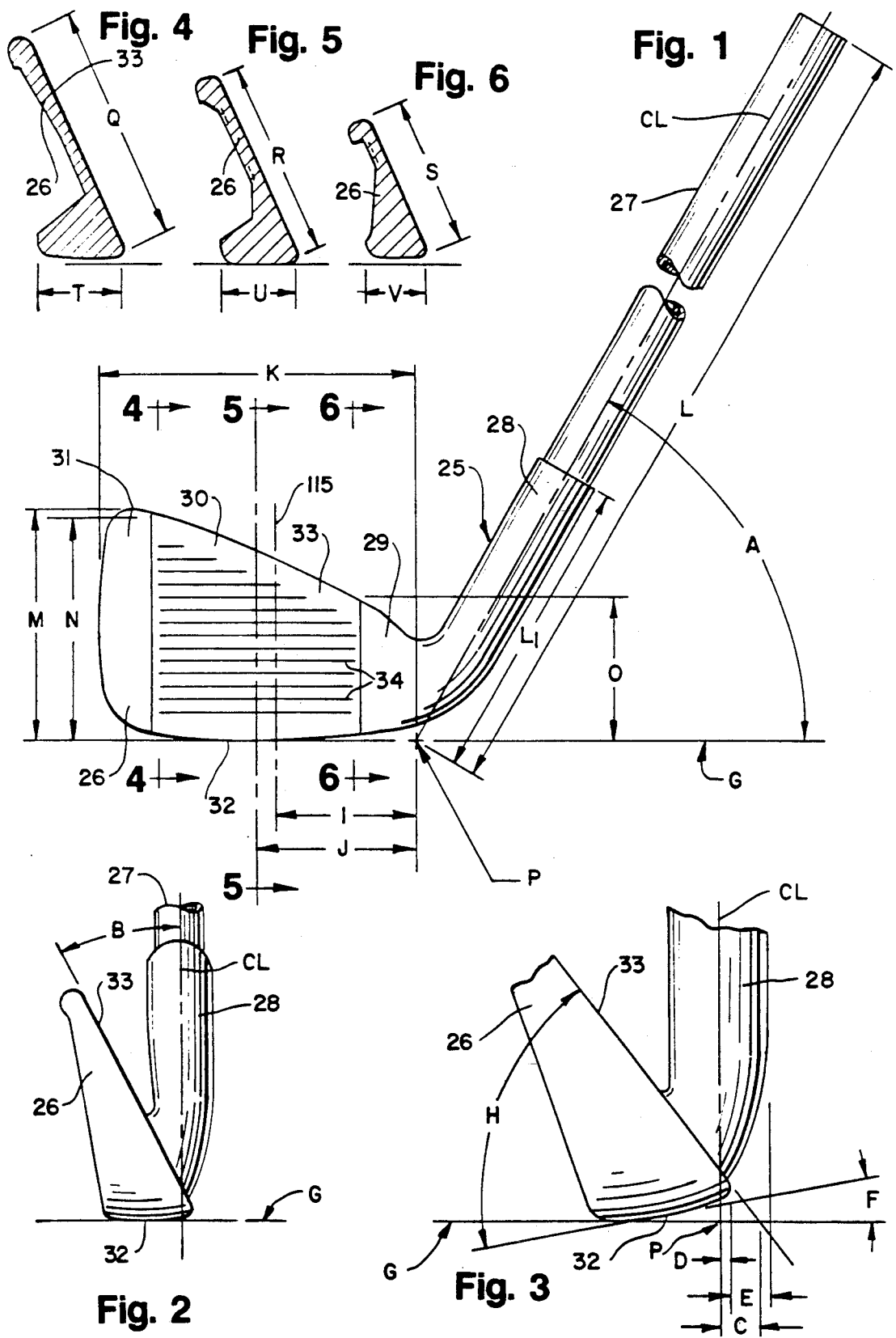

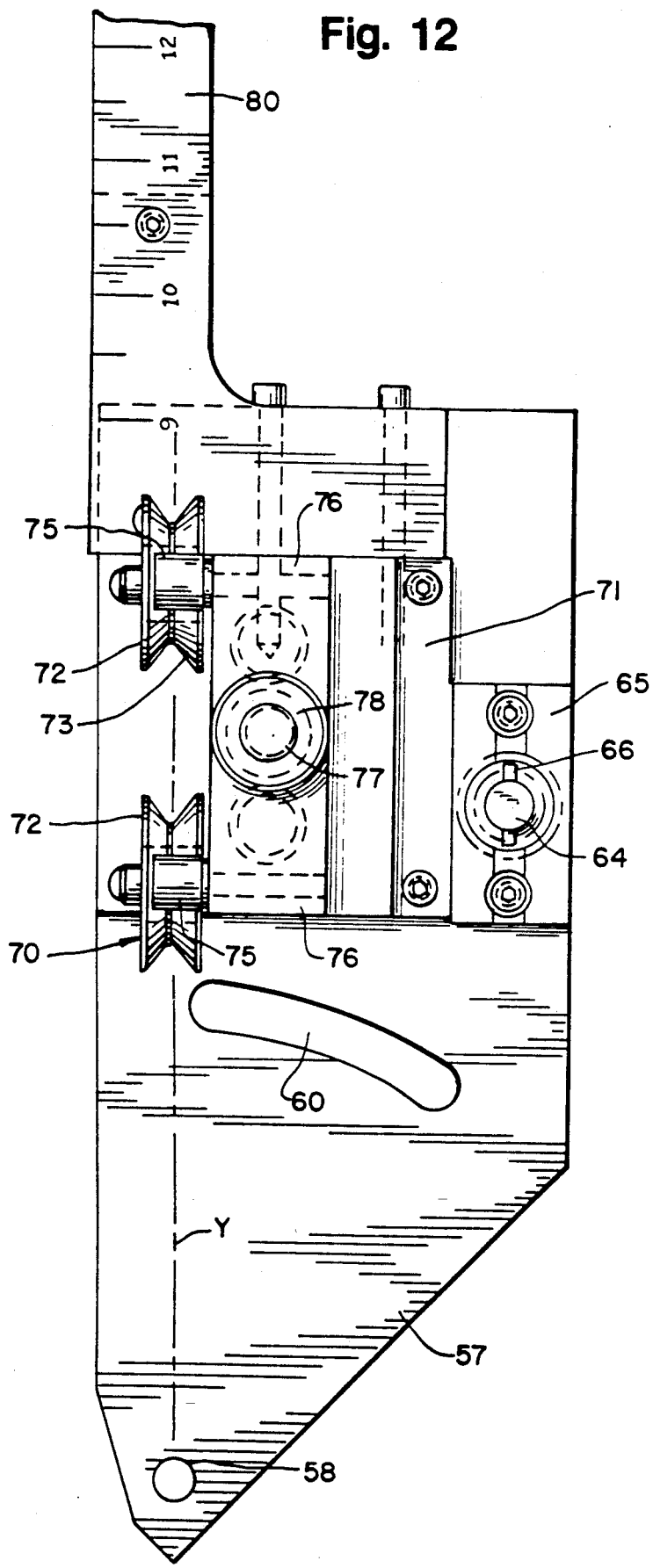

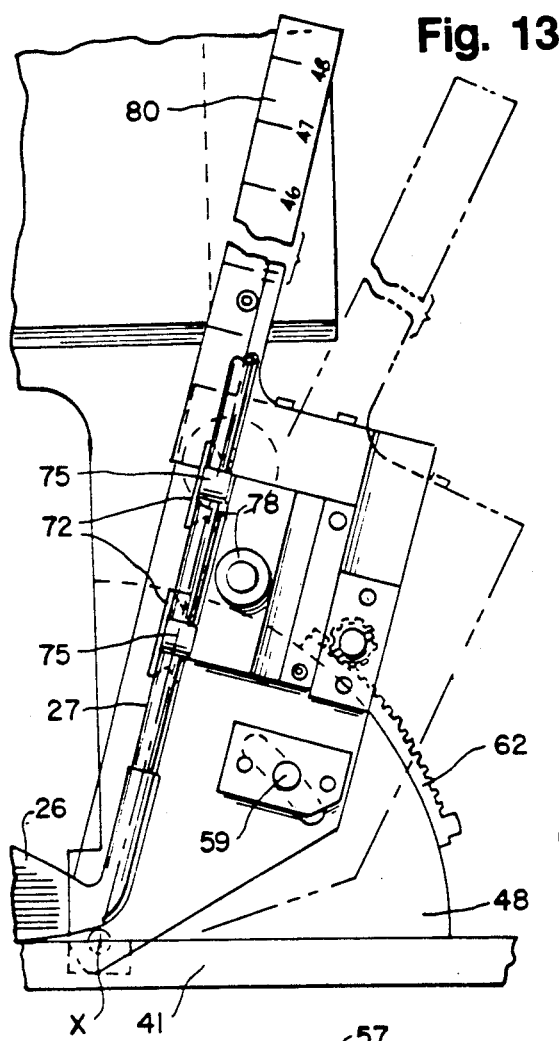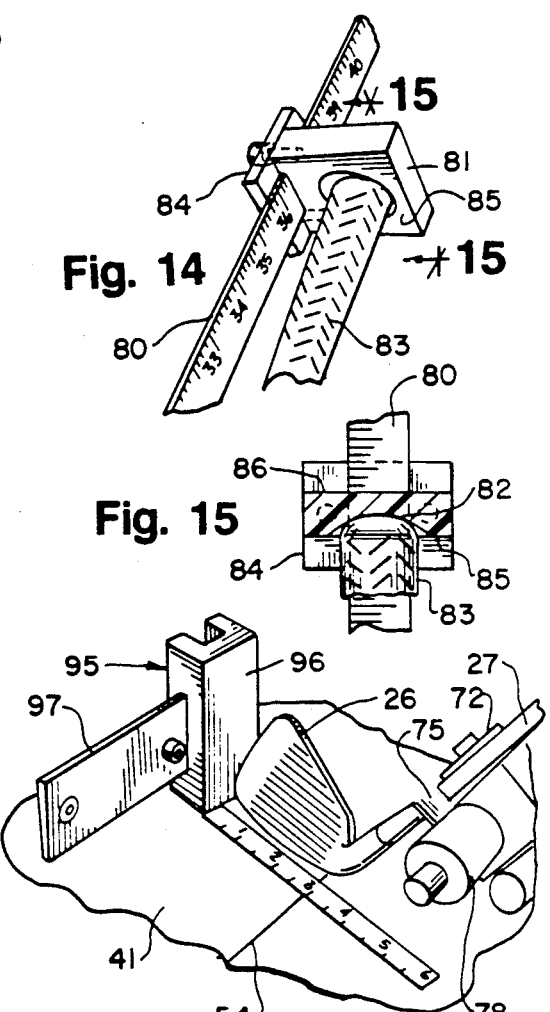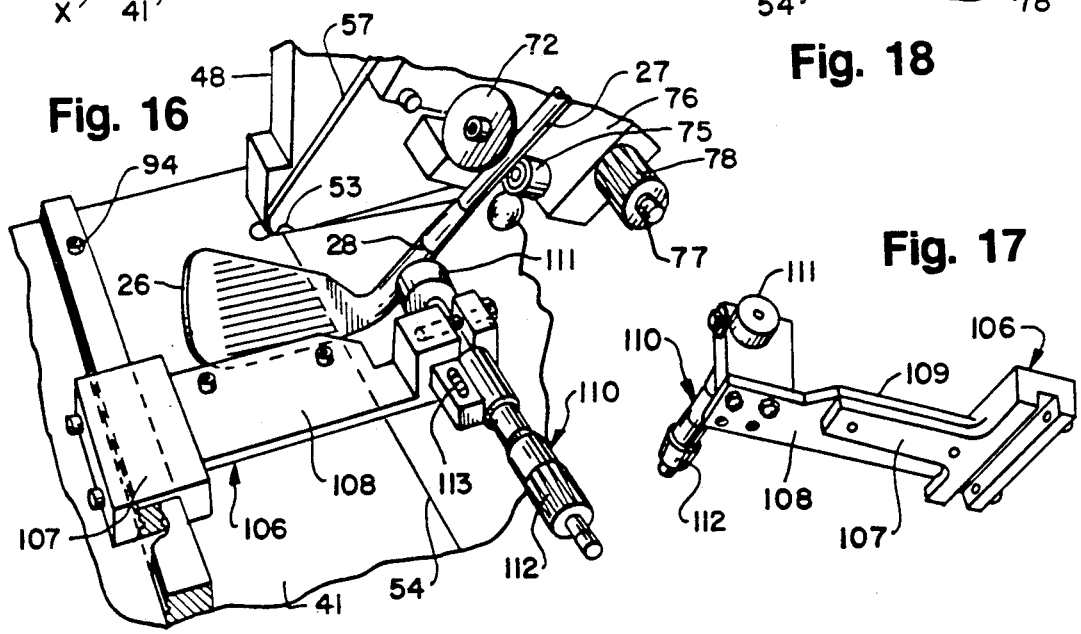

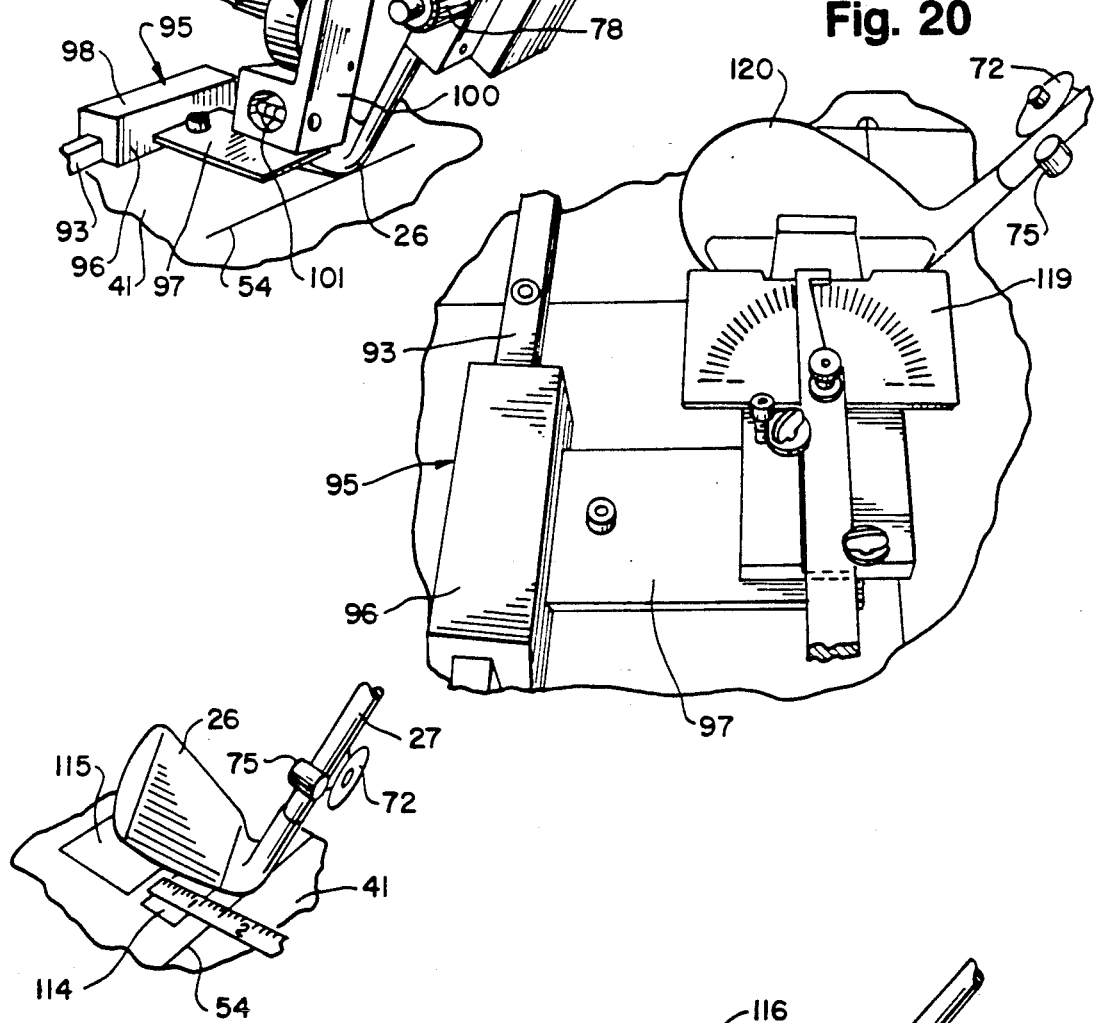

APPARATUS FOR MEASURING GOLF CLUBS

BACKGROUND

This invention relates to a measurement device for golf clubs, and, more particularly, to a device for measuring the length, lie, and loft of a golf club as well as many other fitting variables.

There are many important variables in a golf club which affect the playability of the club in the hands of a particular player. Some of those variables are shaft length, lie, and loft. Shaft length is a measurement of the length of the club. Lie is the angle between the centerline of the shaft and the clubhead. Loft is the angle between the plane of the face of the clubhead and a vertical plane which extends through the centerline of the shaft. Although the terms, length, lie, and loft are standard terms in the golf club industry, the terms do not always mean the same thing, and there are no standard procedures for measuring those variables.

Various devices have been used for facilitating the measurement of golf clubs. Such devices include length boards, Sung Fung gauges, center golf gauges, and Dela Cruse gauges. A length board is used by laying the club on the board and using a ruler along the back side of the club. Although this is a relatively convenient way to measure length, it has some fundamental shortcomings. For example, the length reading is dependent on the lie and the hosel diameter since these gauges are based on the assumption that the touch point on the sole of the club is the same distance from the shaft centerline for all clubs in the set and for all sets.

The book entitled "The Complete Golf Club Fitting Plan, Fitting Variable #4 Club Length," by Ralph Maltby states that the best and most accurate method for measuring a golf club is to measure the distance between the end of the club shaft and the point at which the centerline of the shaft passe through the ground plane. However, the measurement procedure which is described in the book does not precisely measure that dimension. The book states that the easiest way to measure clubs is to set the club in the correct lie position and place a rigid ruler behind the club and touching the heel. Because the ruler is displaced from the centerline of the shaft, the bottom of the ruler does not extend as far as the point at which the centerline of the shaft passes through the ground plane. Also, the book does not describe any fixture or apparatus for positioning the club with respect to a fixed reference point.

The Sung Fung and Dela Cruse gauges have a pivot point which is not in the ground plane. Accordingly, as the shaft pivots, the position of the end of the shaft changes relative to the ground plane.

SUMMARY OF THE INVENTION

The invention overcomes the problems of the current non-standard procedures for measuring golf clubs. The basis for a good measurement system is a good frame of reference. A good measurement system will allow measurement values to be used by all club manufacturers and golf professionals who fit golf clubs to individual players without ambiguity. The invention uses a reference system which is defined by a horizontal plane (the ground) and a vertical plane which contains the centerline or axis of the shaft of the golf club. The centerline of the shaft passes through the horizontal plane at a point P.

The invention provides an apparatus for holding a golf club in a position so that the centerline of the shaft passes through the point P regardless of the angle of the centerline with respect to the horizontal. The apparatus includes a base having a horizontal flat top surface and a pivot plate which is pivotally mounted with respect to the base for pivoting movement about a pivot axis which lies in the flat top surface of the base. Rollers are mounted on the pivot plate for holding the shaft of a golf club so that the centerline of the shaft passes through the pivot axis and lies in a plane which is perpendicular to the pivot axis. A ruler on the pivot plate measures the distance between the pivot axis and the upper end of the shaft. An protractor on the pivot plate measures the lie angle between the centerline of the shaft and the top surface of the base. A second protractor is mounted on a face plate which is engageable with the face of the clubhead for measuring the loft angle of the face. Since the club is maintained in the apparatus with respect to the fixed point P, many other measurements can be conveniently made such as hosel length, hosel offset, face angle offset, shaft centerline offset, etc.

DESCRIPTION OF THE DRAWING

The invention will be explained in conjunction with an illustrative embodiment shown in the accompanying drawing, in which —

FIG. 1 is a front elevational view of a golf club, partially broken away, which has its clubhead soled on a horizontal ground plane G and the centerline CL of its shaft lying in a vertical plane;

FIG. 2 is a fragmentary side elevational view of the golf club of FIG. 1;

FIG. 3 is an enlarged fragmentary view of FIG. 2;

FIG. 4 is a sectional view taken along the line 4—4 of FIG. 1;

FIG. 5 is a sectional view taken along the line 5—5 of FIG. 1;

FIG. 6 is a sectional view taken along the line 6—6 of FIG. 1;

FIG. 12 is a front elevational view, partially broken away, of the pivot plate and the holding device for the golf club shaft;

FIG. 13 is a view similar to FIG. 8 showing alternate positions of the pivot plate;

FIG. 14 is a fragmentary perspective view of the upper end of the golf club shaft and the length-measuring ruler;

FIG. 15 is a fragmentary sectional view taken along the line 15—15 of FIG. 14;

FIG. 16 is a fragmentary perspective view showing the clubhead soled on the base plate of the apparatus and a slide plate for squaring the leading edge of the clubhead;

FIG. 17 is a bottom perspective view of the slide plate;

FIG. 18 illustrates the measurement of the blade length of the clubhead;

FIG. 19 illustrates the measurement of the loft angle of the clubhead;

FIG. 20 illustrates a device for measuring the face of a wooden clubhead;

FIG. 21 illustrates the measurement of the distance between the touch point of the sole and the reference point P; and FIG. 22 illustrates the measurement of the face angle offset.

DESCRIPTION OF SPECIFIC EMBODIMENT

Figure 7:
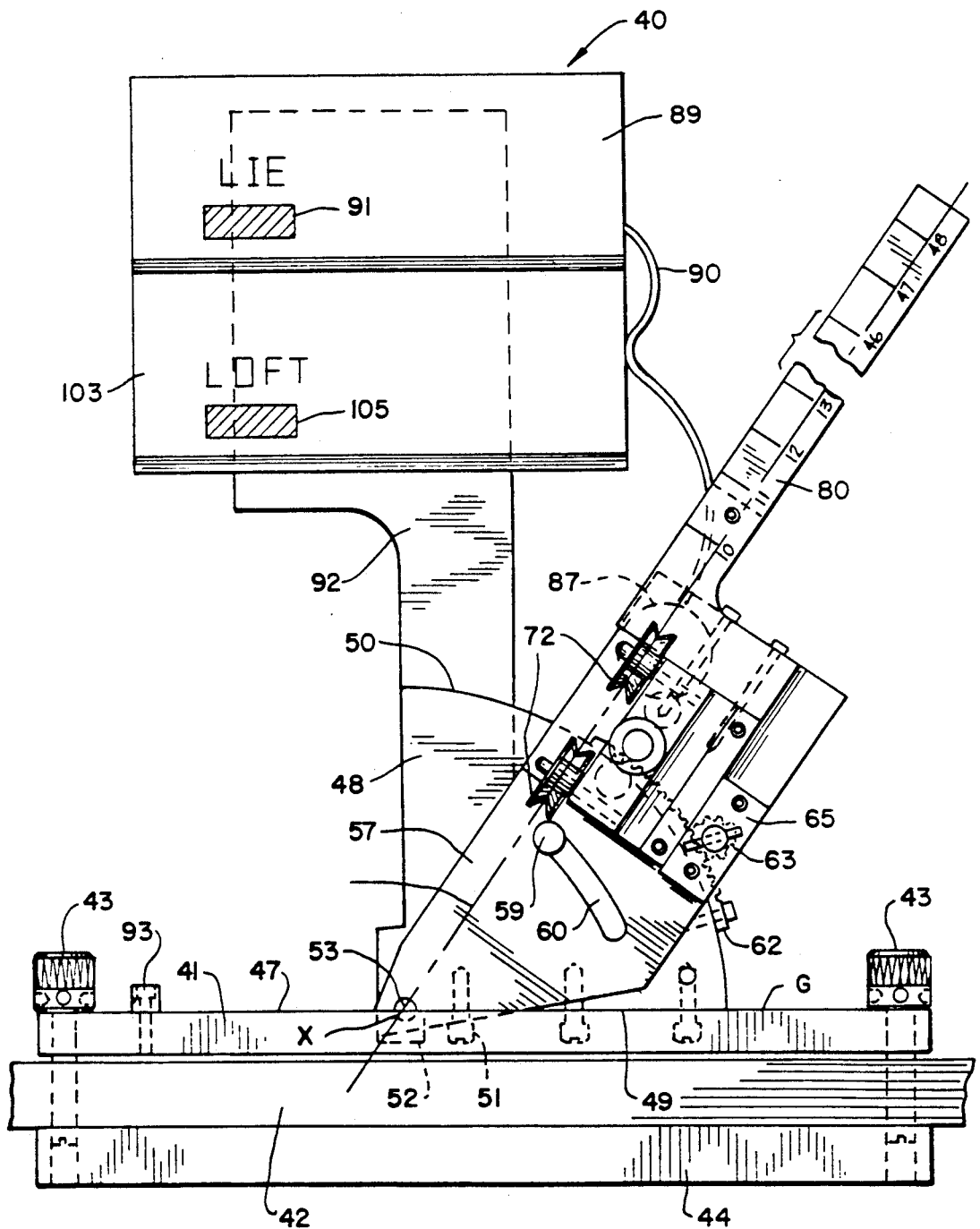
FIG. 7 is a front elevational view of an apparatus for measuring golf clubs which is formed in accordance with the invention.

Referring first to FIG. 1, a conventional golf club 25 includes a clubhead 26 and a shaft 27. For convenience of illustration, the standard grip on the upper end of the shaft is omitted in FIG. 1. The clubhead includes a hosel portion 28 in which the shaft is inserted and secured, a heel portion 29, a central portion 30, and a toe portion 31. The clubhead has a curved bottom surface or sole 32 and a flat face 33 which is adapted to strike a golf ball. The face is provided with conventional score lines or grooves 34.

Most golf clubs are designed so that the score lines or grooves 34 are horizontal to the ground plane G when the club is held properly. When the grooves are horizontal, the sole contacts the ground plane and the centerline CL of the shaft 27 lies in a vertical plane, the lie of the club is the angle A between the horizontal ground plane G and the centerline CL of the shaft. The loft of the club is the angle B (FIG. 2) between the plane of the face 33 and the centerline CL of the shaft.

The centerline CL of the shaft passes through the ground plane G at a point P. In order to adopt an unambiguous, standard length measurement, the length of the length L of the club is the distance between the point P and the upper end of the shaft. Similarly, the length $L_1$ of the hosel is the distance between the point P and the upper end of the hosel.

Referring to FIG. 3, other measurements of the clubhead can be made with reference to the fixed point P. Some of those measurements are set forth in Table I.

TABLE I

| Measurement | Definition |
| --- | --- |
| Face angle offset C | Distance between the centerline CL and the intersection of the face plane with the ground plane |
| Shaft centerline offset D | Distance between the centerline and the leading edge of the clubhead |
| Hosel offset E | Distance between the leading edge of the clubhead and the outside of the hosel |
| Bounce angle F | The tangential angle between the center of the sole and the ground plane G |
| Sole angle H | 90 degrees − loft angle + bounce angle |
| Centerline of touch point to 0 (I in FIG. 1) | Distance between the touch point of the sole and the reference point P |
| Centerline of score lines to 0 (J in FIG. 1) | Distance between the center of the score lines indicated by the line 5-5 in FIG. 1 and reference point P |
| Blade length from 0 | Distance between the toe |

TABLE I-continued

| Measurement | Definition |
| --- | --- |
| (K in FIG. 1) | end of the clubhead and reference point P |

Other dimensions of the clubhead which are of interest include the blade height at the toe (dimension M in FIG. 1); the blade height at the outside edge of the score liens (dimension N in FIG. 1); the blade height at the inside edge of the score lines (dimension O in FIG. 1); the face height at the outside edge of the score lines (dimension Q in FIG. 4); the face height at the centerline of the score lines (dimension R in FIG. 5); the face height at the inside edge of the score iines (dimension S in FIG. 6); the sole width at the outside edge of the score lines (dimension T in FIG. 4); the sole width at the centerline of the score lines (dimension U in FIG. 5); and the sole width at the inside edge of the score lines (dimension V in FIG. 6).

Figure 8:
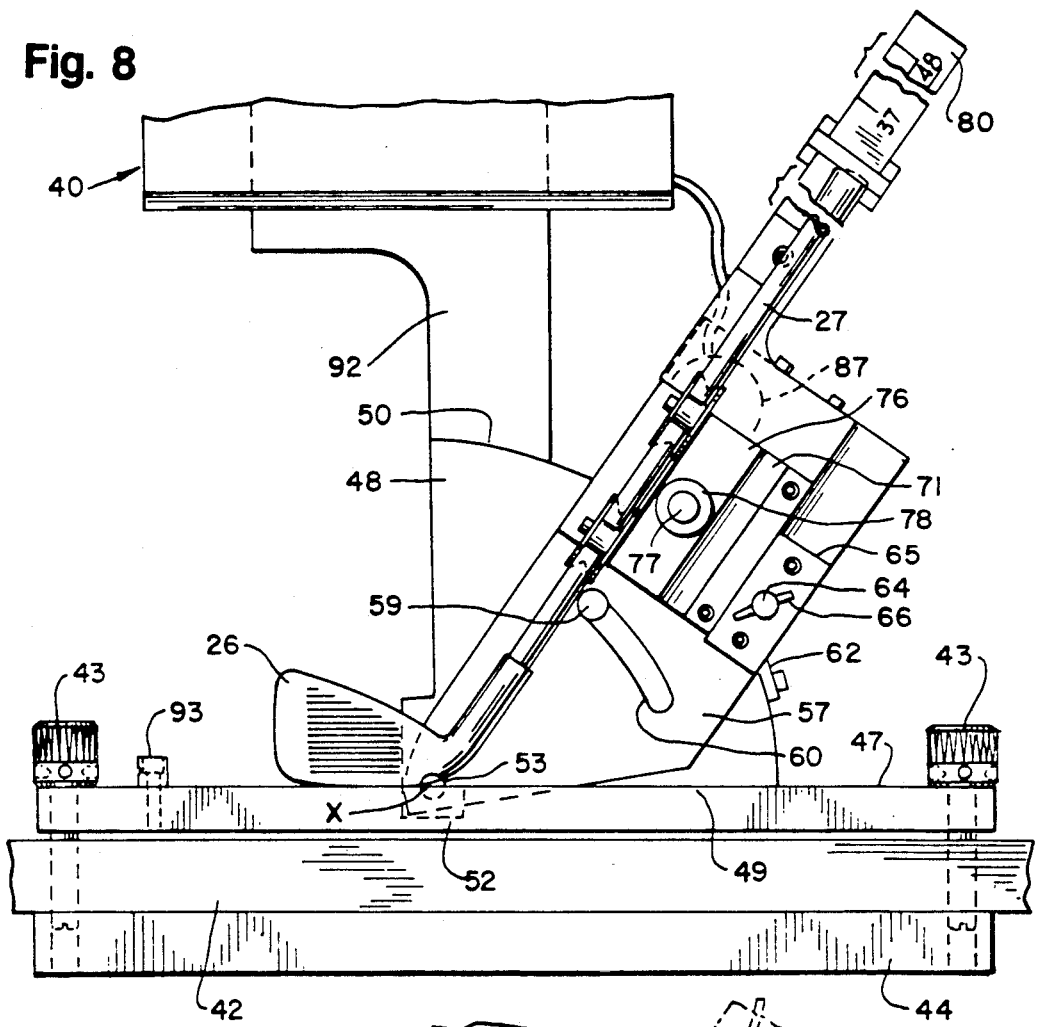
FIG. 8 is a fragmentary view similar to FIG. 7 showing a golf club positioned in the apparatus.

FIGS. 7 and 8 illustrate a apparatus 40 for maintaining a golf club in the reference position in which the centerline of the shaft always passes through the reference point P regardless of the angle between the shaft and the horizontal. The apparatus includes a flat base plate 41 which is mounted on top of a flat table top 42. The base plate is clamped to the table top by two bolts 43 which extend through the base plate and the table top and which are threadedly engaged with a bar 44 below the table top (see also FIG. 10). Four leveling screws 46 (FIG. 10) are threadedly engaged with openings at the corners of the base plate for leveling the flat top surface 47 of the base plate to ensure that the surface is horizontal. The flat top surface 47 corresponds to the ground plane G.

A mounting plate 48 extends vertically upwardly from the top surface of the base plate. The mounting plate has a flat bottom surface 49 which is supported by the flat to surface 47 of the base plate and a curved top surface 50. The mounting plate is secured to the base plate by three bolts 51 (FIG. 7). The bolt holes in the base plate are counterbored so that the bolt heads are recessed with the base plate. The mounting plate includes a lug portion 52 which extends downwardly into an opening in the base plate, and a dowel pin 53 extends through the lug portion 52 of the mounting plate and is positioned so that the axis of the pin lies in the flat top surface 47 of the base plate. The axis is indicated by the letter X in FIGS. 7 and 8, and a scribe line 54 (FIG. 10) is provided on the top surface of the base plate coincident with the axis X.

Figure 10:
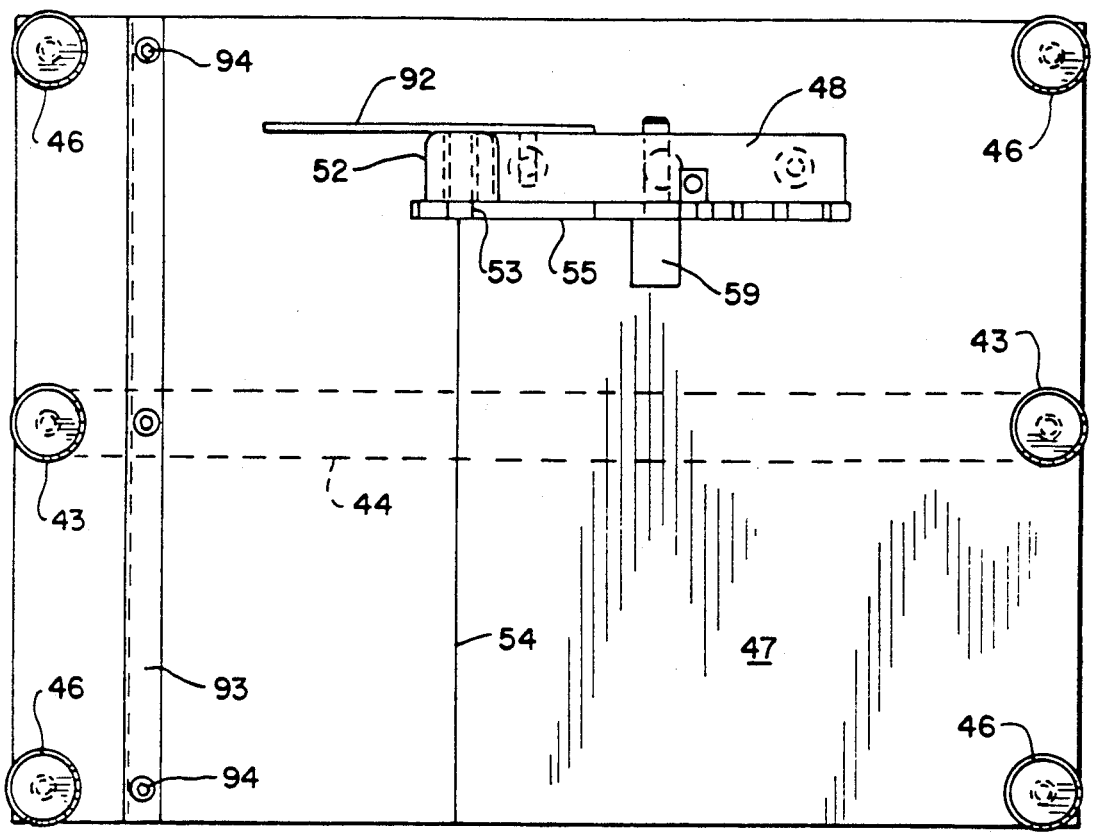
FIG. 10 is a top plane view of FIG. 9.

As can be seen in FIG. 10, a slot 55 is provided in the base plate adjacent the front face of the mounting plate 48, and the dowel pin 53 extends across the width of the slot. The lower end of a pivot plate 57 is inserted into the slot 55 and is pivotally supported by the dowel pin 53, which passes through an opening 58 (FIG. 12) in the pivot plate. The pivot plate is thereby mounted for pivoting movement about the axis X, and the angular position of the pivot plate is maintained in a desired position by a tensioning screw 59 which extends through a curved slot 60 and into a threaded opening in the mounting plate 48. The center of curvature of the slot 60 is the axis X. The tensioning screw 59 clamps the pivot plate against the flat front face of the mounting plate.

Figure 9:
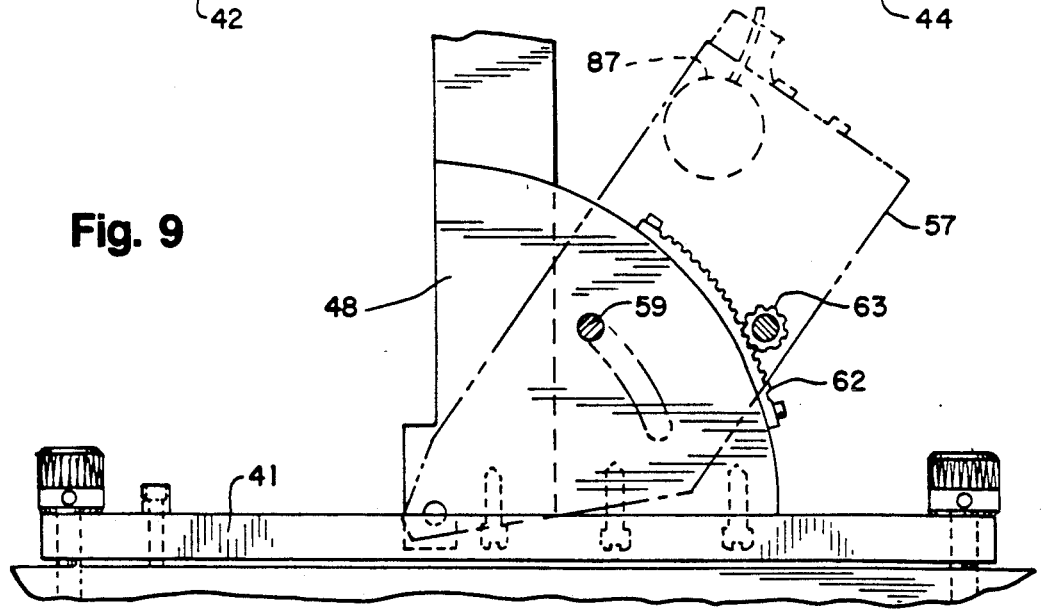
FIG. 9 is a view similar to FIG. 8 with the pivot plate of the apparatus shown in phantom outline.

The angular position of the pivot plate 57 is adjusted by a curved rack gear 62 which is mounted on the curved top surface 50 of the mounting plate 48 and a pinion gear 63 (FIGS. 7, 9, and 11), which is rotatably mounted on the pivot plate. The gear 63 is mounted on a gear shaft 64 which extends through a mounting block 65 which is bolted to the pivot plate 57. A cross rod 66 extends through the outer end of the gear shaft 64 to facilitate rotating the gear shaft and the gear. The center of curvature of the curved gear rack 62 is the axis X, and rotation of the gear shaft 64 and the gear 63 overcomes the clamping force provided by the tensioning screw 59 and causes the pivot plate 57 to pivot about the axis X.

Figure 11:
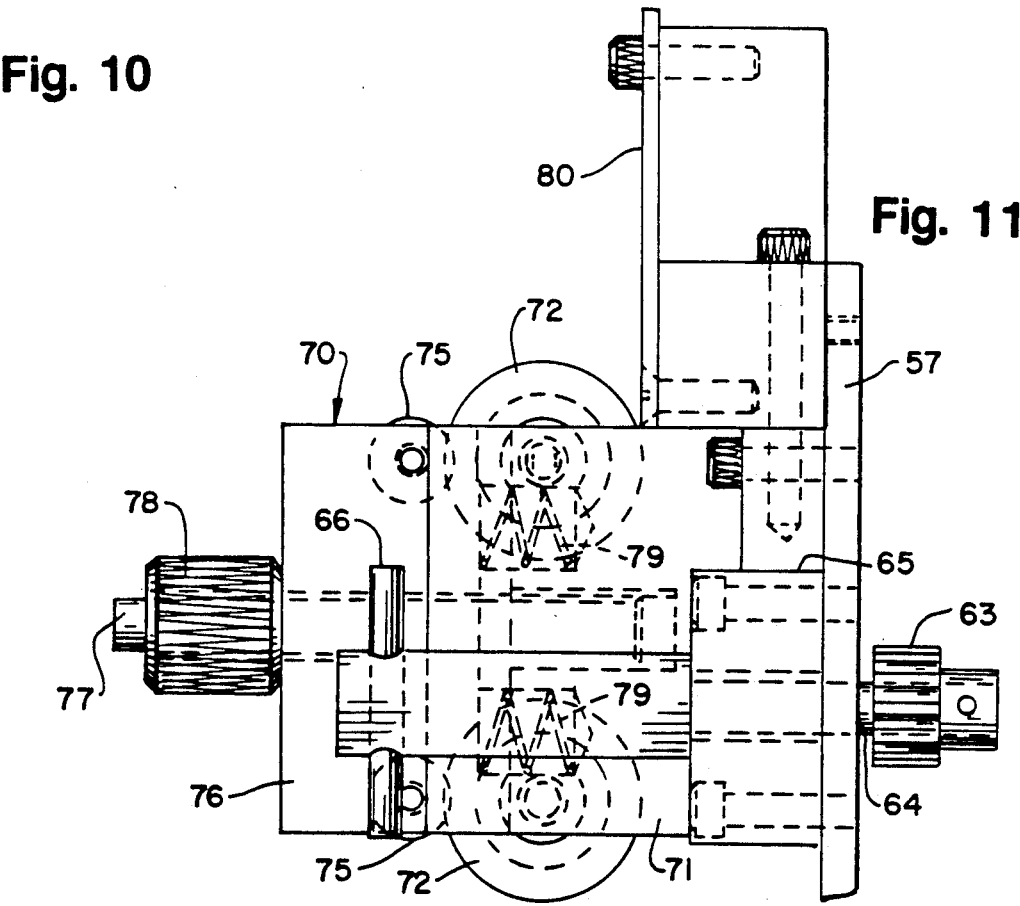
FIG. 11 is fragmentary side elevational view of the pivot plate and the holding device for the golf club shaft.

Referring to FIGS. 11 and 12, a club-holding assembly 70 is mounted on the pivot plate 57 for maintaining the shaft of a golf club in the reference position. The club-holding assembly 70 includes first mounting block 71 which is bolted to the pivot plate and a pair of grooved rollers 72 which are rotatably mounted on the mounting block 71. Each of the grooved rollers has a generally V-shaped groove 73, and the rollers 72 are positioned on the pivot plate so that the centers of the grooves are aligned along a line Y (FIG. 12) which extends from the center of the pivot opening 58. The line Y lies in a centering plane which is defined by the grooves 73 which extends through the pivot axis X and perpendicularly to the pivot plate 57.

The axes of rotation of the grooved rollers 72 extend perpendicularly to the line Y and the pivot axis X of the pivot plate 57. The pivot plate 57 pivots in a vertical plane when the base plate 41 is horizontal, and the axes of the roller 72 are aligned in a vertical plane (see FIG. 11). Accordingly, when a golf club shaft 27 is positioned in the grooved rollers as illustrated in FIG. 8, the shaft will extend in a vertical plane, and the centerline of the shaft will pass through the pivot axis X.

The golf club shaft is retained in the grooved roller 72 by a pair of cylindrical rollers 75 which are rotatably mounted on a second mounting block or clamping block 76. The clamping block 76 is adjustably mounted on the first mounting block 71 by a shaft 77 which extends through an opening in the mounting block 76 and is threaded into a tapped opening in the mounting block 71. A knurled adjusting knob 78 is mounted on the shaft 77 to move the clamping block 76 and the cylindrical rollers 75 toward and away from the grooved rollers 72. A pair of coil springs 79 (FIG. 11) are positioned within recesses in the mounting block 71 and engage the clamping block 76 to resiliently bias the cylindrical rollers 75 away from the grooved rollers 72. After the club shaft is inserted into the grooves of the grooved rollers 72, the adjusting knob 78 is rotated to move the cylindrical rollers 75 toward the shaft to clamp the shaft in the grooves of the rollers 72. However, because the rollers 72 and 75 are rotatably mounted, the shaft can still move longitudinally.

A ruler or scale 80 is bolted to the upper end of the pivot plate 57 and extends upwardly in alignment with the line Y which extends from the pivot opening 58 (FIG. 12) The ruler is provided with measurement units (inches in the embodiment shown) for measuring the distance from the pivot axis X. The length of the shaft of the golf club is measured by determining the point on the scale where the upper end of the shaft terminates.

FIGS. 14 and 15 illustrate a measuring plate 81 which can be used to facilitate the length measurement. The plate 81 is provided with a concave recess 82 which fits over the butt end of the grip 83 on the club. The plate 81 is slidably mounted on the ruler 80 by a mounting plate 84 which is bolted to the plate 81. The length of the shaft is measured by reading the scale where the bottom flat surface 85 of the measuring plate 81 intersects the ruler. The bottom surface 85 of the measuring plate 81 is spaced below the butt end of the grip because of the recess 82, and the depth of the recess is selected to accommodate the thickness of the butt end of the grip 83 which extends beyond the end of the shaft. If the shaft does not have a grip, the block 81 is reversed so that the flat surface 86 engages the end of the shaft.

When a club shaft is positioned in the club-holding assembly 70 as illustrated in FIG. 8 and 13, the centerline of the shaft 27 lies in a vertical plane and passes through the pivot axis X of the pivot plate 57. The point at which the centerline passes through the pivot axis X is the reference point P which has been previously described. Since the centerline of the shaft will always be aligned with the reference point P, the point P need not be indicated on the base plate 41. Although it is possible that the point at which the centerline of a shaft passes through the pivot axis X might vary somewhat as the diameter of the shaft varies, the centerline will always pass through the pivot axis X because the grooves of the rollers 72 are aligned in a plane which extends through the pivot axis.

The angular position of the shaft relative to the horizontal can be measured by any convenient means. For example, a protractor scale can be imprinted on the mounting plate 48 to indicate the angular position of the shaft o the edge of the pivot plate 57. However, in the preferred embodiment of the invention the angular position of the shaft is read electronically by an Angle Star Protractor System available from Lucas Sensing Systems, Inc. of Phoenix, Arizona. The Angle Star Protractor includes an angular position sensor 87 (FIGS. 7-9) which is mounted on the back of the pivot plate 57 and is connected to a control box 89 (FIG. 7) by a cable 90. As is well known in the art, the sensor 87 senses its angular position relative to the horizontal, and the control box 89 provides an LED readout of the angle in the display window 91. The control box is supported by a vertically extending support plate 92 which is bolted to the back of the mounting plate 48.

A guide rail 93 (FIGS. 10, and 19) is mounted on the top surface of the base plate by three bolts 94 (FIG. 10). A slide assembly 95 (FIG. 19) includes a base 96 and a flat plate 97 which is supported by the base in a horizontal position. The base 96 includes a channel-shaped rail portion 98 which rides on the guide rail 93.

The preferred procedure for measuring the lie and loft angles of the club is illustrated in FIG. 19. The slide assembly 95 is moved along the rail 93 until the horizontal plate 97 engages the face of the club. A loft angle gauge assembly 99 is then positioned on the horizontal plate 97 and against the face of the club. The loft angle gauge assembly 99 includes an L-shaped block 100 which is provided with a flat rear face for engaging the face of the club. A pair of pins or a knife edge project from the rear face of the block 100 for engaging one of the grooves 34. The pins or knife edge are aligned in parallel with bubble level 101 which is mounted in an opening in the block 100. The club face is squared with respect to the plate 97, and the pivot plate 57 and the shaft 27 are rotated by rotating the pinion gear 63 until the bubble level 101 indicates that the grooves 34 are horizontal. The lie angle is then read in the LED display window 91.

A second Angle Star Protractor System 102 is mounted on the block 100 and reads the angular position of the flat face-engaging surface of the block relative to the vertical and provides input to a control box 103 (FIG. 7) through a cable 104. An LED readout of the loft angle is displayed in the display window 105.

Because the golf club is maintained by the club-holding assembly in the reference position in which the centerline of the shaft is in a vertical plane and extends through the pivot axis X, other measurements can be conveniently made. Referring to FIG. 18, the blade length of the clubhead can be measured by positioning a reference block against the toe of the club-holding and measuring the distance from the reference block to the score line 54. The particular reference block illustrated in FIG. 18 is the base 96 of the slide assembly 95 which was previously described relative to FIG. 19.

FIG. 16 illustrates the procedure for measuring the hosel offset. A slide assembly 106 includes a base 107 which is similar to the base 96 and which is slidably mounted on the rail 93 and a plate 108 which has a flat surface 109 (FIG. 17) which is adapted to engage the leading edge of the clubhead. A micrometer assembly 110 is mounted on the plate 108 and includes a hosel-engaging block 111 which can be moved toward and away from the hosel by an adjusting knob 112. The position of the hosel-engaging block 111 relative to the flat surface 109 of the plate 108 is indicated by a scale 113. The slide assembly 106 is moved along the rail 93 until the flat surface 109 engages the leading edge of the clubhead. The adjusting knob 112 is then rotated to move the block 111 against the hosel, and the hosel offset is read on the scale 113.

FIG. 21 illustrates the procedure for measuring the centerline of touch point to P (dimension I in FIG. 1). A pair of paper shims 114 are placed below the sole of the club at the toe and at the heel to ensure that the manufacturer-designed touch point of the sole (indicated by line 115 in FIG. 1) engages the base plate. The distance between the touch point and the scribe line 54 is then measured.

FIG. 22 illustrates the procedure for measuring the face angle offset (dimension C in FIG. 3). A flat face plate 116 is grasped by a knob 117 and positioned against the face of the club. The bottom of the face plate 116 is provided with a knife edge 118, and the distance between the knife edge 118 and the vertical plane which passes through the centerline of the shaft is measured.

FIG. 20 illustrates a conventional protractor 119 mounted on the slide assembly 95 for measuring the face angle on a wood club 120.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. An apparatus for measuring a golf club comprising:
a base having a flat top surface;
a pivot plate pivotally mounted relative to the base for pivoting movement about a pivot axis which lies in the plane of the flat top surface of the base;
holding means on the pivot plate adapted for releasably holding the shaft of a golf club so that the centerline of the shaft is perpendicular to said pivot axis and passes through said pivot axis; and
measuring means adapted for measuring the distance from said pivot axis to the end of a shaft of a golf club in the holding means.

2. The apparatus of claim 1 including a mounting plate attached to the base and extending upwardly therefrom, the pivot plate being pivotally supported by the mounting plate.

3. The apparatus of claim 2 in which the mounting plate includes a flat bottom surface which is supported by the flat top surface of the base and a pivot-supporting portion which extends downwardly into an opening in the base, the pivot-supporting portion being provided with a pivot opening for a pivot pin, the centerline of the pivot opening lying in the plane of the flat top surface of the base, the pivot plate extending into a slot in the base and being pivotally mounted on the mounting plate by a pivot pin which extends into said pivot opening.

4. The apparatus of claim 2 including a curved gear rack mounted on the mounting plate, the center of the curvature of the gear rack lying on said pivot axis, a gear rotatably mounted on the pivot plate and engaging the gear rack, and means attached to the gear for rotating the gear whereby rotation of the gear causes pivoting movement of the pivot plate.

5. The apparatus of claim 2 in which the pivot plate is provided with a curved slot, the center of curvature of the curved slot lying on said pivot axis, and a bolt mounted on the mounting-plate and extending through the slot for clamping the pivot plate against the mounting plate.

6. The apparatus of claim 1 in which said holding means includes means for permitting a shaft of a golf club to move longitudinally within the holding means as the pivot plate pivots about said pivot axis.

7. The apparatus of claim 1 in which said holding means on the pivot plate includes a pair of grooved rollers which are rotatably mounted on the pivot plate about a pair of axes which extend perpendicularly to said pivot axis of the pivot plate and which are spaced apart along a line which is perpendicular to said pivot axis and passes through said pivot axis whereby when a shaft of a golf club is inserted into the grooves of the rollers the centerline of the shaft is perpendicular to said pivot axis and passes through said pivot axis.

8. The apparatus of claim 7 in which said holding means further includes means for releasably securing a shaft of a golf club in the grooves of the rollers.

9. The apparatus of claim 7 in which said holding means further includes a clamping block movably mounted on the pivot plate for movement toward and away from the grooved rollers, at least one roller rotatably mounted on the clamping block for rotation about a axis which extends parallel to the axes of the grooved rollers, and screw means for moving the clamping block toward the grooved rollers for releasably securing a shaft of a golf club between the grooved rollers and the roller on the clamping block.

10. The apparatus of claim 1 in which said base is adapted to be mounted on a support and
said base having means thereon for adjusting the base relative to the support so that the top surface of the base can be aligned horizontally.

11. The apparatus of claim 1 in which said measuring means comprises a ruler which extends perpendicularly to said pivot axis and is aligned with said holding means whereby a golf club shaft in said holding means lies alongside the ruler.

12. The apparatus of claim 1 in which the top surface of the base is provided with a reference line which is aligned with said pivot axis.

13. The apparatus of claim 1 in which said holding means defines a centering plane which extends through said pivot axis and perpendicularly to said pivot plate, and means for measuring the angle between the centering plane and the top surface of the base.

14. The apparatus of claim 1 including means for measuring the angle between a plane which extends perpendicularly to the base and through the centerline of a shaft of a golf club held by the holding means and the plane of the face of the golf club.

15. The apparatus of claim 1 including a track mounted on the flat top surface of the base and extending parallel to said pivot axis, and a slide assembly mounted on the track for movement in a direction parallel to the pivot axis, the slide assembly including a flat surface which extends perpendicularly to the pivot axis and is adapted to engage the leading edge of a golf club when the shaft of the golf club is held by the holding means.

16. The apparatus of claim 15 including means on the slide assembly for measuring the distance between the hosel of a golf club when the shaft of the golf club is held by the holding means and the flat surface of the slide assembly.

17. An apparatus for measuring a golf club comprising:
a base having a flat top surface;
a mounting plate attached to the base and extending upwardly therefrom;
a pivot plate pivotally supported by the mounting plate for pivoting movement about a pivot axis which lies in the plane of the flat top surface of the base;
holding means on the pivot plate for releasably holding the shaft of a golf club so that the centerline of the shaft is perpendicular to said pivot axis and passes through said pivot axis;
length measuring means attached to the pivot plate for measuring the distance from said pivot axis to the end of a shaft of a golf club in the holding means;
lie measuring means for measuring the angle between the centerline of a shaft of a golf club held by the holding means and the top surface of the base; and
loft measuring means for measuring the angle between a plane which extends perpendicularly to the base and through the centerline of a shaft of a golf club held by the holding means and the plane of the face of the golf club.

18. The apparatus of claim 17 including a curved gear rack mounted on the mounting plate, the center of the curvature of the gear rack lying on said pivot axis, a gear rotatably mounted on the pivot plate and engaging the gear rack, and means attached to the gear for rotating the gear whereby rotation of the gear causes pivoting movement of the pivot plate.

19. The apparatus of claim 18 in which said holding means on the pivot plate includes a pair of grooved rollers which are rotatably mounted on the pivot plate about a pair of axes which extend perpendicularly to said pivot axis of the pivot plate and which are spaced apart along line which is perpendicular to said pivot axis and passes through said pivot axis whereby when the shaft of a golf club is inserted into the grooves of the rollers the centerline of the shaft is perpendicular to said pivot axis and passes through said pivot axis.

* * * * *

UNITED STATES PATENT AND TRADEMARK OFFICE
CERTIFICATE OF CORRECTION

PATENT NO. : 5,105,550
DATED : April 21, 1992
INVENTOR(S) : James L. Shenoha It is certified that error appears in the above-identified patent and that said Letters Patent is hereby corrected as shown below:

Col. 8, line 54 change "a" to --an--.

Col. 10, line 31 insert --a-- after "along".

Signed and Sealed this

Fifteenth Day of June, 1993

Attest:

MICHAEL K. KIRK

*Attesting Officer*   *Acting Commissioner of Patents and Trademarks*